US012263918B2

(12) United States Patent
Esbensen et al.

(10) Patent No.: US 12,263,918 B2
(45) Date of Patent: Apr. 1, 2025

(54) CONTROL SYSTEM FOR STABILIZING A FLOATING WIND TURBINE

(71) Applicant: Siemens Gamesa Renewable Energy A/S, Brande (DK)

(72) Inventors: Thomas Esbensen, Herning (DK); Kasper Laugesen, Esbjerg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 518 days.

(21) Appl. No.: 17/635,482

(22) PCT Filed: Jul. 24, 2020

(86) PCT No.: PCT/EP2020/070998
§ 371 (c)(1),
(2) Date: Feb. 15, 2022

(87) PCT Pub. No.: WO2021/032407
PCT Pub. Date: Feb. 25, 2021

(65) Prior Publication Data
US 2022/0332392 A1    Oct. 20, 2022

(30) Foreign Application Priority Data
Aug. 22, 2019    (EP) .................................... 19193195

(51) Int. Cl.
*B63B 21/50*    (2006.01)
*B63B 35/44*    (2006.01)
(Continued)

(52) U.S. Cl.
CPC .............. *B63B 21/50* (2013.01); *B63B 35/44* (2013.01); *B63B 39/00* (2013.01); *F03D 13/25* (2016.05);
(Continued)

(58) Field of Classification Search
CPC ......... B63B 21/00; B63B 21/50; B63B 35/00; B63B 35/44; B63B 39/00; B63B 2035/446; F03D 13/00; F03D 13/25; F05B 2240/93
(Continued)

(56) References Cited

U.S. PATENT DOCUMENTS 8,129,852 B2 *   3/2012   Edwards ................. B63B 39/02
                                                    290/44
8,471,396 B2 *   6/2013   Roddier ................. B63B 39/03
                                                    290/44
(Continued)

FOREIGN PATENT DOCUMENTS

CN    103688052 A    3/2014
CN    105966557 A    9/2016
(Continued)

OTHER PUBLICATIONS

International Search Report & Written Opinion for PCT/EP2020/070998 issued Nov. 11, 2020.

*Primary Examiner* — Lars A Olson
(74) *Attorney, Agent, or Firm* — Schmeiser, Olsen & Watts, LLP

(57) ABSTRACT

Provided is a control system for stabilizing a floating wind turbine, the comprising a detection device for monitoring an offset from a predetermined floater pitch angle and/or an offset from a predetermined floater yaw angle, wherein the detection device is further configured for monitoring an oscillating motion of the floater pitch angle and/or the floater yaw angle, wherein the predetermined floater pitch angle and floater yaw angle define a predetermined balanced state of the floating wind turbine, wherein a threshold of the oscillating motion of the floater pitch angle and the oscillating motion of the floater yaw angle further define the predetermined balanced state of the floating wind turbine, (Continued)

and an actuation device configured for manipulating the oscillating motion of the floater pitch angle and/or the oscillating motion of the floater yaw angle until the predetermined balanced state of the floating wind turbine is met.

16 Claims, 2 Drawing Sheets

(51) Int. Cl.
*B63B 39/00* (2006.01)
*F03D 13/25* (2016.01)

(52) U.S. Cl.
CPC ..... *B63B 2035/446* (2013.01); *F05B 2240/93* (2013.01)

(58) Field of Classification Search
USPC .......................................................... 114/382
See application file for complete search history.

(56) References Cited

U.S. PATENT DOCUMENTS

| | | | |
|---|---|---|---|
| 9,879,654 | B2 * | 1/2018 | Peiffer .................... B63B 39/03 |
| 2010/0025996 | A1 | 2/2010 | Diver |
| 2011/0037264 | A1 | 2/2011 | Cermelli |
| 2012/0304911 | A1 | 12/2012 | Mccoy et al. |
| 2014/0339828 | A1 | 11/2014 | Peiffer et al. |
| 2019/0210697 | A1 | 7/2019 | Crupi |

FOREIGN PATENT DOCUMENTS

| | | |
|---|---|---|
| CN | 107600352 A | 1/2018 |
| CN | 109715487 A | 5/2019 |
| DE | 724281 C | 8/1942 |
| GB | 2 442 718 A | 4/2008 |
| WO | 9106466 A1 | 5/1991 |
| WO | 2009/131826 A2 | 10/2009 |

\* cited by examiner

CONTROL SYSTEM FOR STABILIZING A FLOATING WIND TURBINE

CROSS-REFERENCE TO RELATED APPLICATIONS

This application claims priority to PCT Application No. PCT/EP2020/070998, having a filing date of Jul. 24, 2020, which claims priority to EP Application No. 19193195.5, having a filing date of Aug. 22, 2019, the entire contents both of which are hereby incorporated by reference.

FIELD OF TECHNOLOGY

The following relates to a control system for stabilizing a floating wind turbine. Further, the following relates to a floating wind turbine and a method for stabilizing a floating wind turbine.

BACKGROUND

In the technical field of floating wind turbines, it is known that floating wind turbines may be subject to additional motions due to additional degrees of freedom compared to conventional wind turbines. This additional motion may cause severe loads on the floating wind turbine and a decrease in the annual power production. For example, if the floater pitches, the shear force at the interface between the tower and the nacelle may increase due to increased gravitational loads. Furthermore, for a spar buoy floater concept of a floating wind turbine a conventional drive train closed loop speed-pitch control may cause an instability in a floater pitch motion. This may be due to interfering of the floater pitch motion and a natural frequency of the control system adding negative damping into the floating wind turbine system. Another challenge in today's floating wind turbines may be potential large motions of the floating foundation, e.g., a rotation of the floating foundation in yaw may cause severe loads on the mooring line system. However, also a vertical motion in heave may cause severe loads. Furthermore, there may be a potential risk that at specific wave frequencies vortex introduced vibration may occur which may result in inducing structural vibrations.

A floater pitch motion may further introduce challenges in existing estimates, such as determining a rotational speed from a hub acceleration and other components in a tower acceleration. For instance, a heave motion may interfere with an accelerometer and a gyroscope creating a wrong estimate afterwards used in a controller.

Therefore, in today's floating wind turbines a floater pitch motion instability is solved by adding an additional reference speed signal to the speed-pitch control in such a way that the controller reference does not interfere with the floating wind turbine system. The input comes from a gyroscope or an accelerometer measuring a tilt angle of the floating wind turbine or measuring the tower acceleration.

Other current academic solutions are to detune a speed pitch controller to lower a bandwidth (frequency) such that it does not react on the floater pitch frequency. However, this comes with a poor rotational speed tracking capability. Detuning may be a trade-off between stability and control performance. A yaw motion control has also been implemented to avoid a too large yaw motion in a spar floater concept.

Hence, there may be a need to provide an active system which is able to actively change a global system behaviour of a floating wind turbine such that a control of the floating wind turbine may be providable in a safe and optimal manner. Therefore, the floating wind turbine's translation and/or rotation during operation are limited respectively stabilized. Additionally, a power production may be increased. Additionally, loads acting on the floating wind turbine may be decreased and therefore a durability of the floating wind turbine may be increased.

SUMMARY

An aspect relates to a control system for stabilizing a floating wind turbine. The control system comprises a detection device configured for monitoring an offset from a predetermined floater pitch angle and/or an offset from a predetermined floater yaw angle of the floating wind turbine, wherein the detecting device is further configured for monitoring an oscillating motion of the floater pitch angle and/or an oscillating motion of the floater yaw angle, wherein the predetermined floater pitch angle and the predetermined floater yaw angle define a predetermined balanced state of the floating wind turbine, wherein a threshold of the oscillating motion of the floater pitch angle and a threshold of the oscillating motion of the floater yaw angle further define the predetermined balanced state of the floating wind turbine, an actuation device configured for manipulating the floater pitch angle and/or the floater yaw angle until the predetermined balanced state is met, wherein the actuation device is further configured for manipulating the oscillating motion of the floater pitch angle and/or the oscillating motion of the floater yaw angle until the predetermined balanced state of the floating wind turbine is met.

The described control system is based on the idea that a control system may be provided which may stabilize unwanted translations and/or rotations and/or oscillating motions of the floating wind turbine. Therefore, the floating wind turbine may be operated in a safe and optimal manner, with an increased power production and decreased loads on substructures of the floating wind turbine.

This may result in an increased annual power production of the wind farm along with a decrease of loads on the floating wind turbine.

A floating wind turbine comprises a floating foundation which may move. By a movement of the floating foundation the floating wind turbine mounted on the floating foundation moves correspondingly. The motion of the floating foundation respectively the motion of the floating wind turbine may be divided into six individual degrees of freedom, namely three translations a surge, a sway and a heave, and three rotations a roll, a pitch and a yaw.

Furthermore, a wind load, a wave load and/or a current loading, which are irregular by nature, as well as aerodynamical, structural and/or hydrodynamical loadings, as well as a control actuation, all contribute to a complex dynamical behaviour.

Due to similarities in naming between the pitch of the blades and the pitch of the floating foundation, a clear distinction is made in this application by distinguishing between a floater pitch and a blade pitch. Floater pitch denotes a rotation of the floating foundation arounds its point of rotation and a blade pitch denotes a controlled pitching of the blades. Likewise, a floater yaw denotes a rotation of the floating foundation around its vertical axis (heave), and turbine yaw denotes a rotation of a nacelle.

Providing the detection device as a one-piece detection device may provide the possibility to detect the offset from the predetermined floater pitch angle and the offset from the predetermined floater yaw angle as well as the oscillating motion of the floater pitch angle and the oscillating motion of the floater yaw angle with one device. Hence, a cost-efficient way for monitoring if the floating wind turbine is operated in the predetermined balanced state may be providable.

Providing the detection device as a multi part detection device may provide the possibility that at different positions on the floating wind turbine a value of the floater pitch angle and/or a value of the floater yaw angle as well as an oscillating motion of the floater pitch angle and/or an oscillating motion of the floater yaw angle may individually be detected such that even at exposed positions a detection may be possible. Hence, an accurate detection if the floating wind turbine is operated in the predetermined balanced state may be providable.

Providing the actuation device as a one-piece actuation device may provide the possibility that with one single actuation device a plurality of floating wind turbines may be actuated one after another or all at once. Therefore, a low maintenance actuation device may be providable.

Providing the actuation device as a multi part actuation device may provide the possibility that each floating wind turbine may be actuated individually and accurate. Therefore, a time efficient actuation may be providable.

The predetermined floater pitch angle according to embodiments of the present invention may denote a floater pitch angle which corresponds to a vertical alignment of the floating wind turbine. The vertical alignment may also denote an alignment deviating slightly from a vertical for ensuring that a rotor of the floating wind turbine is optimal positioned with respect to an incoming wind field and at the same time shear forces acting on a connection between the nacelle and the tower are deviated into the tower.

The predetermined floater yaw angle according to embodiments of the present invention may denote a floater yaw angle which is adjusted such that the rotor of the floating wind turbine is aligned perpendicular to a wind direction of an incoming wind field.

The oscillating motion of the floater pitch angle according to embodiments of the present invention may denote an instability of the floating wind turbine which may be seen as an oscillation around the floater pitch angle. The oscillation may oscillate with a same frequency as a floater pitch natural frequency.

The oscillating motion of the floater yaw angle according to embodiments of the present invention may denote an instability of the floating wind turbine which may be seen as an oscillation around the floater yaw angle. The oscillation may oscillate with a same frequency as a floater yaw natural frequency.

The threshold of the oscillating motion of the floater pitch angle according to embodiments of the present invention may denote a value which characterizes an amount of oscillation which may still be acceptable for the floating wind turbine. However, if the oscillating motion of the floater pitch angle exceeds the threshold, the oscillating motion of the floater pitch angle may be harmful for the floating wind turbine and/or for a fixing structure of the floating wind turbine.

The threshold of the oscillating motion of the floater yaw angle according to the present application may denote a value which characterizes an amount of oscillation which may still be acceptable for the floating wind turbine. However, if the oscillating motion of the floater yaw angle exceeds the threshold, the oscillating motion of the floater yaw angle may be harmful for the floating wind turbine and/or for a fixing structure of the floating wind turbine.

The predetermined balanced state according to embodiments of the present invention may denote the state in which the rotor of the floating wind turbine is aligned perpendicular to a wind direction of an incoming wind field and minimum loads are acting on a connection between the nacelle and the tower of the floating wind turbine. Additionally, in the predetermined balanced state any occurring oscillating motion of the floater pitch angle and/or of the floater yaw angle is/are small and do not exceed the threshold of the oscillating motion of the floater pitch angle and/or the threshold of the oscillating motion of the floater pitch angle.

The detection device may detect when a given threshold of the oscillating motion of the floater pitch angle and/or a given threshold of the oscillating motion of the floater yaw angle is exceeded and hence activates a respective actuation device.

The detection device may continuously monitor the oscillating motion of the floater pitch angle and/or the floater yaw angle. Therefore, the detection device together with the actuation device may make sure that an instability does not occur.

According to an exemplary embodiment in the predetermined balanced state the offset from the predetermined floater pitch angle is in the range of −10° to +10°, particularly −5° to +5°, more particularly −2° to +2°, even more particularly 0°.

Defining the offset from the predetermined floater pitch angle in the predetermined balanced state to be in a certain range, particularly in the range of −10° to +10°, more particularly in the range of −5° to +5%, even more particularly in the range of −2° to +2°, even more particularly 0°, may provide the possibility that a trade-off between a decreased load acting on substructures of the floating wind turbine and an increased power production may be achieved. Particularly due to the fact that a certain alignment of the floating wind turbine relatively to the incoming wind field may be possible.

The offset from the predetermined floater pitch angle being zero may provide the possibility that a precise alignment with the predetermined balanced state may be met.

According to an exemplary embodiment of the invention, in the predetermined balanced state the offset from the predetermined floater yaw angle is in the range of −10° to +10°, particularly −5° to +5°, more particularly −2° to +2°, even more particularly 0°.

Defining the offset from the predetermined floater yaw angle in the predetermined balanced state to be in a certain range, particularly in the range of −10° to +10°, more particularly in the range of −5° to +5%, even more particularly in the range of −2° to +2°, even more particularly 0°, may provide the possibility that a trade-off between a decreased load acting on substructures of the floating wind turbine and an increased power production may be achieved. Particularly due to the fact that a certain alignment of the floating wind turbine relatively to the incoming wind field may be possible.

The offset from the predetermined floater yaw angle being zero may provide the possibility that a precise alignment with the predetermined balanced state may be met.

According to an exemplary embodiment of the invention, in the predetermined balanced state the offset from the predetermined floater pitch angle is zero and/or the offset from the predetermined floater yaw angle is zero.

According to an exemplary embodiment of the invention, the threshold of the oscillating motion of the floater pitch angle and/or the threshold of the oscillating motion of the floater yaw angle is in the range of −5° to +5°, particularly −2° to +2°, more particularly 0°.

Defining the threshold of the oscillating motion of the floater pitch angle in the predetermined balanced state to be in the range of −5° to +5%, particularly in the range of −2° to +2°, may provide the possibility that a large oscillating behaviour in the floating wind turbine system may be inhibited. Particularly, if the threshold may be 0°, no oscillating motion occurs in the floating wind turbine.

Defining the threshold of the oscillating motion of the floater yaw angle in the predetermined balanced state to be in the range of −5° to +5%, particularly in the range of −2° to +2°, may provide the possibility that a large oscillating behaviour in the floating wind turbine system may be inhibited. Particularly, if the threshold may be 0°, no oscillating motion occurs in the floating wind turbine.

According to a further embodiment of the invention, the detection device is mounted to a substructure of the floating wind turbine, particularly to a nacelle, a blade, a tower and/or a floating foundation.

A substructure of the floating wind turbine may denote a nacelle, a blade, a tower and/or a floating foundation of the floating wind turbine.

Mounting the detection device on one substructure of the floating wind turbine may provide the possibility that a fast detection based on the detected value of the offset from the predetermined floater yaw angle and/or the detected value of the offset from the predetermined floater pitch angle may be providable. Additionally, or alternatively a fast detection based on the detected value of the oscillating motion of the floater pith angle and/or the detected value of the oscillating motion of the floater yaw angle may be providable.

Mounting one respective detection device at more than one substructure of the floating wind turbine may provide the possibility that a precise detection of a value of the offset from the predetermined floater yaw angle and/or the predetermined floater pitch angle as well as a value of the oscillating motion of the floater pitch angle and/or a value of the oscillating motion of the floater yaw angle may be providable.

The substructure to which the detection device is mounted may be chosen based on which substructure is indicative for the measured floater yaw angle and/or floater pitch angle and/or the oscillating motion of the floater pitch angle and/or the oscillating motion of the floater yaw angle.

Alternatively, the substructure to which the detection device is mounted may be chosen based on which is an optimal position for the chosen detection device. For example, a blade load sensor may be mounted to a blade and hence to the rotor of the floating wind turbine.

According to a further exemplary embodiment, the detection device comprises at least one of the group consisting of a spinner pressure sensor, a wind speed sensor, a wind direction sensor, a blade load sensor.

The spinner pressure sensor may detect an offset from the predetermined floater yaw angle, an offset from the predetermined floater pitch angle, an oscillating motion of the floater pitch angle and/or an oscillating motion of the floater pitch angle by measuring a pressure difference that changes as a function of a rotor azimuth angle.

Using the spinner pressure sensor may provide the possibility that an already integrated sensor may additionally provide values of the offset from the predetermined floater pitch angle and/or the offset from the predetermined floater yaw angle and/or the oscillating motion of the floater pitch angle and/or the oscillating motion of the floater yaw angle.

The wind speed sensor may detect an offset from the predetermined floater pitch angle and/or an oscillating motion of the floater pitch angle by measuring a change in the wind speed due to a turbine nacelle's movement.

Using the wind speed sensor may provide the possibility that an already integrated sensor may additionally provide values of the offset from the predetermined floater pitch angle and/or the oscillating motion of the floater pitch angle.

The wind direction sensor may detect an offset from the predetermined floater pitch angle and/or an oscillating motion of the floater pitch angle by measuring an incoming wind direction at a specific substructure of the floating wind turbine.

Using the wind direction sensor may provide the possibility that an already integrated sensor may additionally provide values of the offset from the predetermined floater pitch angle and/or the oscillating motion of the floater pitch angle.

The blade load sensor may detect an offset from the predetermined floater pitch angle and/or an oscillating motion of the floater pitch angle and/or an offset from the predetermined floater yaw angle and/or an oscillating motion of the floater yaw angle by measuring a blade load changing dependent on a certain alignment of the blade relatively to the incoming wind field and/or the inclination of the floating wind turbine.

Using the blade load sensor may provide the possibility that a mapping of a floater yaw misalignment/oscillation and/or a floater pitch misalignment/oscillation may be providable. Therefore, a precise detection of the offset from the predetermined floater pitch angle and/or the predetermined floater yaw angle as well as an occurrence of the oscillating motion of the floater pitch angle and/or the oscillating motion of the floater yaw angle may be providable.

According to a further exemplary embodiment of the invention, the detection device is mounted to a fixing structure to which the floating wind turbine is mounted, particularly a mooring line of the fixing structure.

The fixing structure of the floating wind turbine may denote a part of the floating wind turbine which keeps the floating wind turbine in place and by which the alignment of the floating wind turbine along each of the six degrees of freedom may be possible.

Mounting the detection device to the mooring line of the floating wind turbine may provide the possibility that an offset from the predetermined floater pitch angle and/or the predetermined floater yaw angle may be detectable at an additional position on the floating wind turbine system. Additionally, there may be provided the possibility that an oscillating motion of the floater pitch angle and/or an oscillating motion of the floater yaw angle may be detectable at an additional position on the floating wind turbine system.

According to an exemplary embodiment of the present invention, the detection device comprises a strain gauge.

The strain gauge may detect an offset from the predetermined floater pitch angle, an offset from the predetermined floater yaw angle, an oscillating motion of the floater pitch angle and/or an oscillating motion of the floater yaw angle. Particularly by mounting one strain gauge to each of the mooring lines holding in place the floating wind turbine, a deviation from the predetermined balanced state may be detected.

Using the strain gauge mounted to the mooring line may provide the possibility to detect the deviation from the predetermined balanced state in more detail and fast.

According to an exemplary embodiment of the invention, the detection device comprises a sensor which is configured for detecting an operation mode of the floating wind turbine.

The operation mode of the floating wind turbine may denote whether the floating wind turbine is operating, is idling or is in service. The operation mode may influence the behaviour of the floating wind turbine. Additionally, if the floating wind turbine is idling an increase in power production may not be important and a decrease in loads on the substructures of the floating wind turbine may be more important. If the floating wind turbine is in service/operating an increase in power production may be more important. Additionally, for an operating floating wind turbine, a decrease in the offset from the predetermined floater pitch angle and/or the predetermined floater yaw angle as well as a decrease in the oscillating motion of the floater pitch angle and/or the floater yaw angle may be more important.

Detecting the operation mode of the floating wind turbine may provide the possibility to determine the predetermined balanced state accurately and precise.

According to an exemplary embodiment of the present invention, the actuation device comprises an adjustable spoiler on a nacelle and/or an active blade add-on.

The adjustable spoiler may denote an aerofoil which may be adjusted dependent on the incoming wind field detected on the blade by the detection device.

Adjusting the aerofoil may provide the possibility that a contact surface of the nacelle and/or the blade and/or the tower may be enlarged such that a higher drag load acts on the nacelle and/or the blade and/or the tower. Therefore, the offset and/or the oscillating motion of the floater pitch angle and/or the floater yaw angle may be adapted.

The active blade add-on may for example be an add-on which can be actively adjusted or activated dependent one the given conditions, i.e., active blade add-ons act on an input from a controller unit.

According to an exemplary embodiment of the invention, the actuation device comprises a mooring line actuator.

One mooring line actuator attached to each of the mooring lines holding in place the floating wind turbine may provide the possibility to reposition the floating wind turbine along each of or a combination of the surge, the sway, the heave, the roll, the pitch and the yaw. Additionally, a mooring line actuator may provide the possibility to influence an overall system behaviour such as the natural frequency of the floating wind turbine and therefore to influence the oscillating motion of the floater pitch angle and/or the floater yaw angle. The mooring line actuator may be installed in the floating foundation such that the mooring line actuator may actively adapt the length of one mooring line.

According to an exemplary embodiment of the present invention, the actuation device comprises an adjustable damper configured for damping a vibration of the floating wind turbine.

The vibration of the floating wind turbine may cause translational and/or rotational movements of the floating wind turbine which may cause an offset from the predetermined floater pitch angle and/or from the predetermined floater yaw angle.

The adjustable damper may be configured such that the translational and/or rotational movements may be reduced and in the best case inhibited at all.

Additionally, the adjustable damper may influence, by influencing a damping of the vibration of the floating wind turbine, the oscillating motion of the floater pitch angle and/or the floater yaw angle.

According to an exemplary embodiment of the invention, the actuation device comprises a liquid damper, a mass damper and/or a vortex induced vibration brake.

The liquid damper may comprise a container in which a liquid may be filled in or emptied out dependent on the needed damping. The damping may be directly dependent on the mass of liquid present in the liquid damper. In an embodiment, the liquid damper may work with sea water which is present around the floating wind turbine. The container may be fixed to the floating foundation. Further, the liquid damper may provide the possibility to have an actuation device which is easy and cheap to operate.

The mass damper may by adjustable such that dependent on the needed amount of damping the weight of the mass damper is changed. Furthermore, the mass damper may provide the possibility to have an easy actuation device.

The vortex induced vibration brake may provide the possibility to inhibit the floating wind turbine to lock into a vortex induced vibration locking frequency.

According to a further aspect of embodiments of the invention there is provided a floating wind turbine. The floating wind turbine comprises (a) a wind rotor comprising a blade, (b) a tower to which the wind rotor is mounted, (c) a floating foundation to which the tower is mounted, and (d) an above-described control system.

Also, the described system is based on the idea that a control system may be provided which may stabilize unwanted translations and/or rotations and/or oscillating motions of the floating wind turbine. Therefore, the floating wind turbine may be operated in a safe and optimal manner, with an increased power production and decreased loads on substructures of the floating wind turbine.

According to a further aspect of embodiments of the invention there is provided a method for stabilizing a floating wind turbine. The method comprises (a) monitoring an offset from a predetermined floater pitch angle and/or an offset from a predetermined floater yaw angle of the floating wind turbine, (b) monitoring an oscillating motion of the floater pitch angle and/or an oscillating motion of the floater yaw angle, wherein the predetermined floater pitch angle and the predetermined floater yaw angle define a predetermined balanced state of the floating wind turbine, wherein a threshold of the oscillating motion of the floater pitch angle and a threshold of the oscillating motion of the floater yaw angle further define the predetermined balanced state of the floating wind turbine, (c) manipulating the floater pitch angle and/or the floater yaw angle until the predetermined balanced state is met, and (d) manipulating the oscillating motion of the floater pitch angle and/or the oscillating motion of the floater yaw angle until the predetermined balanced state of the floating wind turbine is met.

Also, the described method is based on the idea that a control system may be provided which may stabilize unwanted translations and/or rotations and/or oscillating motions of the floating wind turbine. Therefore, the floating wind turbine may be operated in a safe and optimal manner, with an increased power production and decreased loads on substructures of the floating wind turbine.

In the following some exemplary embodiments of the present invention are described.

According to an exemplary embodiment of the present invention, a floater pitch misalignment and/or a floater yaw misalignment under operation may be solved in different ways in terms of exploiting a variety of sensors and/or actuators by the control system.

By using another or an additional sensor an improved estimation of an inclination and/or rotation in the floater pitch, roll or yaw may be made. Exemplary sensors which may add to improve information relative to a traditional wind turbine may be one of the following.

A spinner pressure sensor may indicate a yaw misalignment. The spinner pressure sensor may be expanded to indicate a floater pitch offset (i.e., a tilt of the floating wind turbine's structure). The spinner pressure sensor may measure a pressure difference that may change as a function of a rotor azimuth angle. Hence, an estimation of an imbalanced originating from a yaw misalignment but also a tilt may be detected. Thereby the sensor may be used to estimate a pressure difference in the vertical direction indicating a tilt of the hub, meaning the offset from the predetermined floater pitch angle.

A wind speed sensor may indicate a higher or a lower wind speed which may be observed when the floating wind turbine hub moves due to the offset from the predetermined floater pitch angle. This difference in the wind speed may be exploited by the wind speed sensor.

A wind direction sensor may indicate a wind direction which is not only performed in a horizontal direction but also in the vertical direction. Thus, the wind direction may directly indicate a tilt of the floating wind turbine caused by the offset from the predetermined floater pitch angle.

A blade load sensor may indicate an estimated floater pitch misalignment and/or an estimated floater yaw misalignment. This is due to the fact that e.g., a floater yaw misalignment or a floater pitch misalignment may be seen as an imbalance in the measured blade loads. The changes in the load measurements may hence be mapped into a floater yaw misalignment and/or a floater pitch misalignment respectively the offset from the predetermined floater pitch angle and/or the offset from the predetermined floater yaw angle.

A strain gauge on a mooring line may be used to map a strain measured in the gauge into an estimate of the offset from the predetermined floater pitch angle. The higher the strain the larger the offset from the predetermined floater pitch angle.

The spinner pressure sensor, the wind speed sensor and/or the wind direction sensor may already be implemented in the floating wind turbine. Hence, no additional sensor may be required.

The above-described sensors may define ways to improve an estimation of the offset from the predetermined floater pitch angle and/or the offset from the predetermined floater yaw angle. An already inbuilt control system may be used to limit unwanted floater rotation(s) more easily because of an improved information.

In the following exemplary actuators are described which may be more cost-efficient and may provide an extra security layer to control the floating wind turbine.

An active blade add-on may be used to implement positive damping into the floating wind turbine system cancelling a negative damping from a speed-pitch controller and thereby minimizing the floating wind turbine's translation(s) and/or rotation(s).

A spoiler on a top of a nacelle may be utilized to implement positive damping into the floating wind turbine system cancelling a negative damping from a speed-pitch controller and thereby minimizing the floating wind turbine's translation(s) and/or rotation(s).

A vortex induced vibration brake may be used on a floating wind turbine to prevent a locking into a vortex induced vibration locking frequency.

A passive liquid damper may be installed within the floating foundation to add an additional damping into the floating wind turbine system and thereby minimizing the floating wind turbine's translation(s) and/or rotation(s).

The mooring line actuator may be installed within the floating foundation and utilized to balance the offset in rotations by either increasing or decreasing one of the mooring line lengths.

According to an exemplary embodiment of the present invention, the floating wind turbine may be stabilized during operation, idling and/or service. When the floating wind turbine is idling or is maintained, the floating wind turbine should be controlled in such a way that no potential risk of material or personal is present which may occur by stabilizing a floating wind turbine and which may limit a movement of all translations and rotations. This may lead to a potentially larger inspection window.

Embodiments of the present invention may provide the possibility to make use of different sensor and actuator solutions to control the floating wind turbine in an optimal and safe manner. Combinations of sensors and actuators may be used which are not necessarily be found in standard wind turbine configurations.

Limiting or stabilizing the floating wind turbine's translation and/or rotation during operation may be of great interest. During operation an unwanted translation or rotation may lead to decreased power production, increased loadings, and unnecessary controller actuations and/or critical oscillations of the floating wind turbine.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of embodiments of the present invention are apparent from the examples of embodiment to be described hereinafter and are explained with reference to the examples of embodiment. The invention will be described in more detail hereinafter with reference to examples of embodiment but to which embodiments of the invention are not limited.

BRIEF DESCRIPTION

Some of the embodiments will be described in detail, with reference to the following figures, wherein like designations denote like members, wherein.

DETAILED DESCRIPTION

Figure 1:
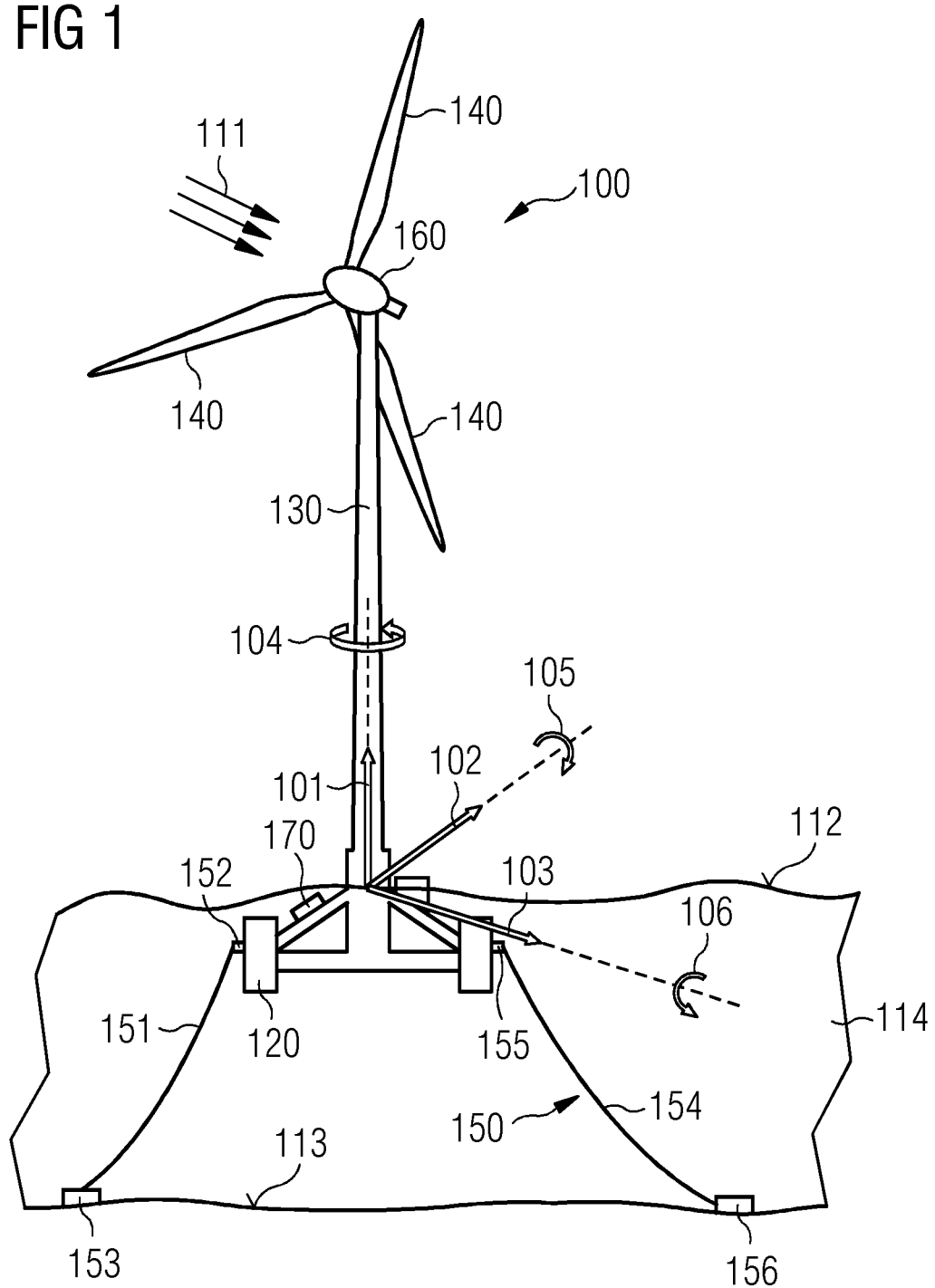
FIG. 1 shows a floating wind turbine according to an exemplary embodiment of the present invention in a predetermined balanced state.

The illustration in the drawings is schematic. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

FIG. 1 shows a floating wind turbine 100 according to an exemplary embodiment of the present invention in a predetermined balanced state. The floating wind turbine 100 comprises three blades 140 mounted to a nacelle 160, a tower 130 and a floating foundation 120. The floating wind turbine 100 further comprises a fixing structure 150 comprising a plurality of mooring lines. Only a first mooring line 151 and a second mooring line 154 are shown in FIG. 1 for clarity reasons. The first mooring line 151 is fixed to the floating foundation 120 by a first mooring line fixation 152 and to a sea ground 113 by a second mooring line fixation 153. Further, the second mooring line 154 is fixed to the floating foundation 120 by a further first mooring line fixation 155 and to the sea ground 113 by a further second mooring line fixation 156.

The floating foundation 120 is fixed by the first mooring line 151 and the second mooring line 152 in such a manner that the floating foundation 120 is dunked into sea water 114 under a sea surface 112. Therefore, the floating foundation 120 is held under water by the first mooring line 151 and the second mooring line 154. An incoming wind field 111 acts on the three blades 140 of the floating wind turbine 100 such that electrical energy may be generated by the floating wind turbine 100.

The floating wind turbine 100 floats in the sea water 114 and is held in position by the mooring lines, exemplarily illustrated by the first mooring line 151 and the second mooring line 154 in FIG. 1. The floating wind turbine 100 has six individual degrees of freedom in which the floating wind turbine 100 may move. Namely, three translations surge 103, sway 102 and heave 101, and three rotations roll 106, pitch 105 and yaw 104. Furthermore, the floating wind turbine 100 is stabilized by a control system 170 mounted to the floating foundation 120. The alignment of the floating wind turbine 100 as shown in FIG. 1 may illustrate a predetermined balanced state.

Figure 2:
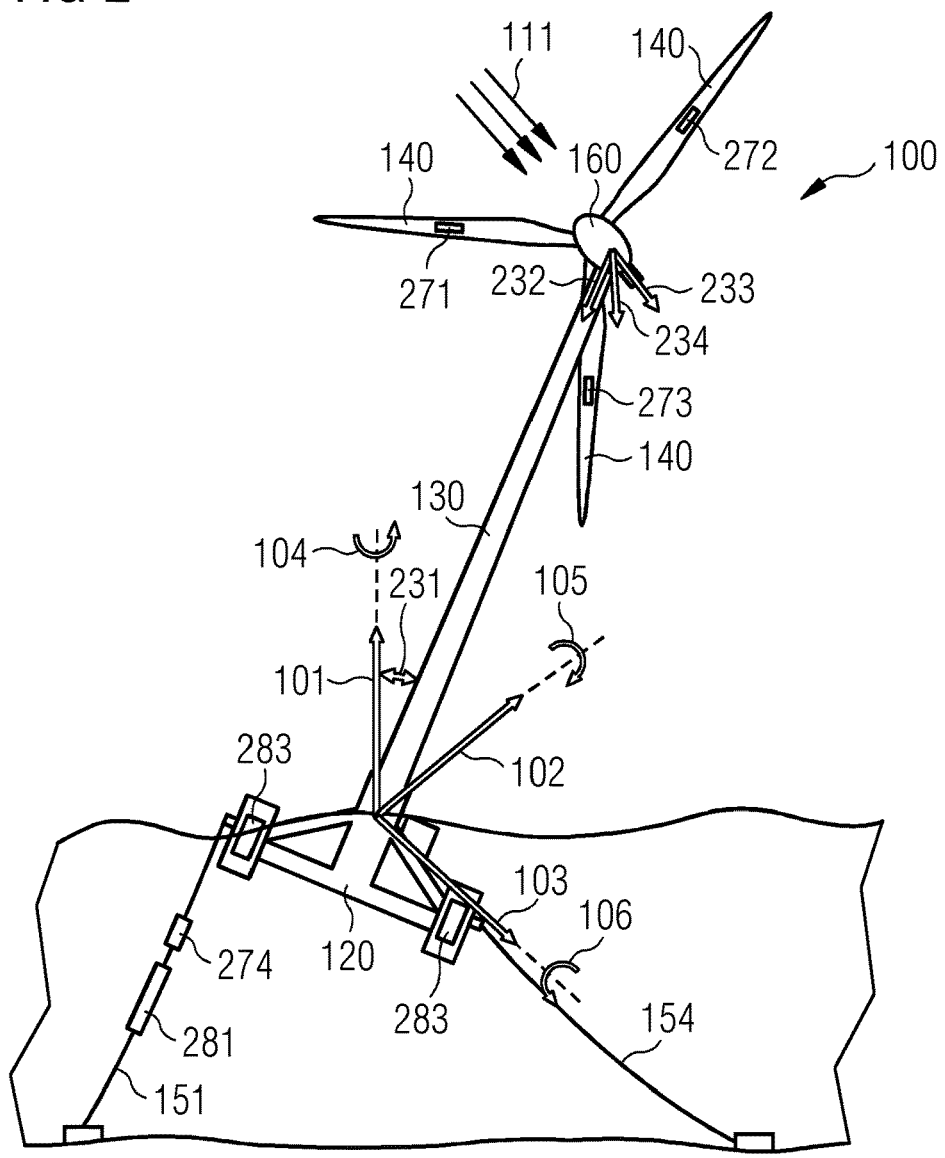
FIG. 2 shows a floating wind turbine according to a further exemplary embodiment of the present invention in an unbalanced state.

FIG. 2 shows a floating wind turbine 100 according to a further exemplary embodiment of the present invention in an unbalanced state.

The floating wind turbine 100 is tilted around the floater pitch 105 such that an offset 231 to the predetermined floater pitch angle occurs. Additionally, the floating wind turbine 100 is tilted around the yaw 104 such that an offset to the predetermined floater yaw angle occurs. The floating wind turbine 100 is tilted by the offset 231 to the predetermined floater pitch angle and the offset to the predetermined floater yaw angle due to the forces of the incoming wind field 111 acting on the three blades 140 of the floating wind turbine 100.

A weight of the nacelle 160 together with forces due to the incoming wind field 111 acting on the three blades 140 compose a weight force 134. The weight force 234 comprises a first force component 232 and a second force component 233. The first force component 232 is parallel to an extension direction of the tower 230 and the second force component 233 is perpendicular to the first force component 232.

Therefore, in the unbalanced state as illustrated in FIG. 2 shearing forces are acting on a connection of the nacelle 160 and the tower 130 due to the offset 131 around the pitch 105 and the offset around the yaw 106.

The offset 231 around the floater pitch 105 and the offset around the floater yaw 106 is detected by a blade load sensor 271, a wind speed sensor 272 and a wind direction sensor 273 each mounted to one of the blades 140 or the nacelle 160. Additionally, a strain gauge 274 contributes to the detection of the offset 231 around the floater pitch 105 and the offset around the floater yaw 106.

The floating wind turbine 100 will then be brought back to the predetermined balanced state as shown in FIG. 1 by a mooring line actuator 281.

Figure 3:
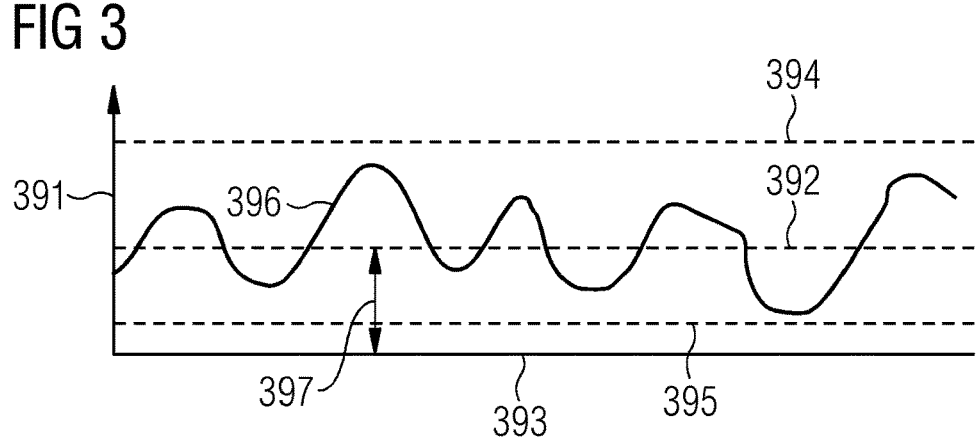
FIG. 3 shows a schematic illustration of an offset of the floater pitch angle and an oscillating motion.

FIG. 3 shows a schematic illustration of an offset 397 of the floater pitch angle 392 and an oscillating motion 396. The floater pitch angle is plotted on the ordinate 391. The floater pitch angle 392 may for example be 5°. The predetermined floater pitch angle 393 may for example be 0°. The offset 397 may therefore be 5°. As shown in FIG. 3, the upper threshold 394 is set to +3° and the lower threshold 395 is set to −3°. As may be seen in FIG. 3, the oscillating motion 396 of the floater pitch angle 392 is within the upper threshold 394 and the lower threshold 395.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A floating wind turbine comprising a wind rotor having a blade, a tower to which the wind rotor is mounted, a floating foundation to which the tower is mounted and a control system for stabilizing the floating wind turbine, the control system comprising: a detection device configured for monitoring an offset from a predetermined floater pitch angle and/or an offset from a predetermined floater yaw angle of the floating wind turbine;
   wherein the detection device is further configured for monitoring an oscillating motion of the floater pitch angle and/or an oscillating motion of the floater yaw angle;
   wherein the predetermined floater pitch angle and the predetermined floater yaw angle define a predetermined balanced state of the floating wind turbine;
   wherein a threshold of the oscillating motion of the floater pitch angle and a threshold of the oscillating motion of the floater yaw angle further define the predetermined balanced state of the floating wind turbine; and
   an actuation device configured for manipulating the floater pitch angle and/or the floater yaw angle until the predetermined balanced state is met and for manipulating the oscillating motion of the floater pitch angle and/or the oscillating motion of the floater yaw angle until the predetermined balanced state of the floating wind turbine is met.

2. The floating wind turbine according to claim 1, wherein in the predetermined balanced state the offset from the predetermined floater pitch angle is in one of the ranges of −10° to +10°, −5° to +5°, −2° to +2°, or 0°, and/or
   wherein in the predetermined balanced state the offset from the predetermined floater yaw angle is in one of the ranges of −10° to +10°, −5° to +5°, −2° to +2°, or 0°.

3. The floating wind turbine according to claim 1,
   wherein the detection device comprises a spinner pressure sensor which is configured for measuring pressure difference in the vertical direction such that the offset from the predetermined floater pitch angle offset can be detected, and/or wherein the detection device comprises a spinner pressure sensor which is configured for detecting the offset from the predetermined floater yaw angle, the oscillating motion of the floater yaw angle by measuring a pressure difference as a function of a rotor azimuth angle.

4. The floating wind turbine according to claim 1, wherein the detection device comprises a wind direction sensor which is configured for measuring a wind direction in a horizontal and in a vertical direction such that a tilt of the floating wind turbine caused by the offset from the predetermined floater pitch angle can be determined.

5. The floating wind turbine according to claim 1, wherein the detection device is mounted to a substructure of the floating wind turbine, selected from a nacelle, a blade, a tower and/or a floating foundation.

6. The floating wind turbine according to claim 1, wherein the detection device comprises at least one of the group consisting of a wind speed sensor and a strain gauge.

7. The floating wind turbine according to claim 1, wherein the detection device is mounted to a fixing structure to which the floating wind turbine is mounted.

8. The floating wind turbine according to claim 1, wherein the detection device comprises blade load sensor which is configured for measuring an imbalance in measured blade loads, and wherein the detection device is configured for estimating floater pitch misalignment and/or floater yaw misalignment by mapping changes in the load measurement into a floater yaw misalignment and/or a floater pitch misalignment respectively the offset from the predetermined floater pitch angle and/or the offset from the predetermined floater yaw angle.

9. The floating wind turbine according to claim 1, wherein the detection device comprises a sensor which is configured for detecting an operation mode of the floating wind turbine.

10. The floating wind turbine according to claim 1, wherein the actuation device comprises an adjustable spoiler on a nacelle and/or an active blade add-on, a mooring line actuator, an adjustable damper configured for damping a vibration of the floating wind turbine, a liquid damper, a mass damper, and/or a vortex induced vibration brake.

11. A method for stabilizing a floating wind turbine, the method comprising:
monitoring an offset from a predetermined floater pitch angle and/or an offset from a predetermined floater yaw angle of the floating wind turbine;
monitoring an oscillating motion of the floater pitch angle and/or an oscillating motion of the floater yaw angle;

wherein the predetermined floater pitch angle and the predetermined floater yaw angle define a predetermined balanced state of the floating wind turbine;
wherein a threshold of the oscillating motion of the floater pitch angle and a threshold of the oscillating motion of the floater yaw angle further define the predetermined balanced state of the floating wind turbine;
manipulating the floater pitch angle and/or the floater yaw angle until the predetermined balanced state is met; and
manipulating the oscillating motion of the floater pitch angle and/or the oscillating motion of the floater yaw angle until the predetermined balanced state of the floating wind turbine is met.

12. The method according to claim 11, wherein in the predetermined balanced state the offset from the predetermined floater pitch angle is in one of the ranges of −10° to +10°, −5° to +5°, −2° to +2°, or 0°, and/or
wherein in the predetermined balanced state the offset from the predetermined floater yaw angle is in one of the ranges of −10° to +10°, −5° to +5°, −2° to +2°, or 0°, and/or
wherein the threshold of the oscillating motion of the floater pitch angle and/or the threshold of the oscillating motion of the floater yaw angle is one of the ranges of −5° to +5°, −2° to +2°, or 0°.

13. The method of claim 11, wherein the detection device comprises a spinner pressure sensor, and wherein the method comprises the step of measuring pressure difference in the vertical direction such that the offset from the predetermined floater pitch angle offset can be detected.

14. The method of claim 11, wherein the detection device comprises wind direction sensor, and wherein the method comprises the step of measuring a wind direction in a horizontal and in a vertical direction such that a tilt of the floating wind turbine caused by the offset from the predetermined floater pitch angle can be determined.

15. The method of claim 11, wherein the detection device comprises blade load sensor, and wherein the method comprises the steps of measuring an imbalance in measured blade loads, and of estimating floater pitch misalignment and/or floater yaw misalignment by mapping changes in the load measurement into a floater yaw misalignment and/or a floater pitch misalignment or into the offset from the predetermined floater pitch angle and/or the offset from the predetermined floater yaw angle.

16. The control system according to claim 7, wherein the detection device is mounted to a mooring line of the fixing structure and/or wherein the detection device comprises a strain gauge.

* * * * *